United States Patent [19]
Hohfeld

[11] Patent Number: 5,485,974
[45] Date of Patent: Jan. 23, 1996

[54] DEVICE FOR SLITTING STRIP METAL

[76] Inventor: Egon Hohfeld, An der langen Hecke 20, D-58644 Iserlohn, Germany

[21] Appl. No.: 256,421

[22] Filed: Jul. 7, 1994

[30] Foreign Application Priority Data

Jan. 9, 1992 [DE] Germany ............ 42 00 351.2

[51] Int. Cl.⁶ .................................. B65H 35/02
[52] U.S. Cl. .................. 242/525.6; 242/530.4; 242/538.1
[58] Field of Search ............ 242/525, 525.1, 242/525.6, 525.7, 530.4, 538, 538.1

[56] References Cited

U.S. PATENT DOCUMENTS

| | | | |
|---|---|---|---|
| 1,849,591 | 3/1932 | Rado | 242/525.7 |
| 2,120,473 | 6/1938 | Sheperdson | 242/525.7 |
| 2,343,720 | 3/1944 | VanNorde | 164/65 |
| 2,827,961 | 3/1958 | Pugh | 242/525 |
| 3,359,842 | 12/1967 | Young | 83/500 |
| 4,173,313 | 11/1979 | Rogers | 242/530.1 |
| 5,086,634 | 2/1992 | Richards | 242/525 |

FOREIGN PATENT DOCUMENTS

| | | |
|---|---|---|
| 682895 | 2/1930 | France . |
| 1502769 | 6/1969 | Germany . |
| 2856066 | 7/1980 | Germany . |
| 3405246 | 4/1985 | Germany . |
| 4200351 | 1/1993 | Germany . |
| 703253 | 12/1979 | U.S.S.R. .............. 242/525.7 |

OTHER PUBLICATIONS

Patent Abstracts of Japan 1–113121 May 1989 (Tsuruta).
Patent Abstracts of Japan 59–7424 Jan. 1984 (Toyosaka).

*Primary Examiner*—John P. Darling
*Attorney, Agent, or Firm*—Herbert Dubno; Andrew Wilford

[57] ABSTRACT

A metal strip wound up in a coil on a feed spool is split by supporting the feed spool for rotation about a horizontal axis and passing the strip along a generally horizontal feed plane through a rotary-blade cutter and subdividing the strip at the cutter into a plurality of even substrips and a plurality of odd substrips interleaved with the even substrips. The even substrips are guided upward in an upper plane forming a small acute angle with the feed plane from the cutter to a respective even-strip windup spool and these even substrips are wound up on the even-strip windup spool. The odd substrips are guided downward in a lower plane forming a small acute angle with the feed plane from the cutter to a respective odd-strip windup spool and these odd substrips are wound up on the odd-strip windup spool. The cutter and the feed spool are rotated at substantially the same speed and both the windup spools are driven at a speed slightly greater than the speed of the cutter and feed spool to pull the substrips from the cutter and the strip from the feed spool. The positions of the spools are adjusted to maintain the planes in substantially the same orientation relative to one another.

3 Claims, 2 Drawing Sheets

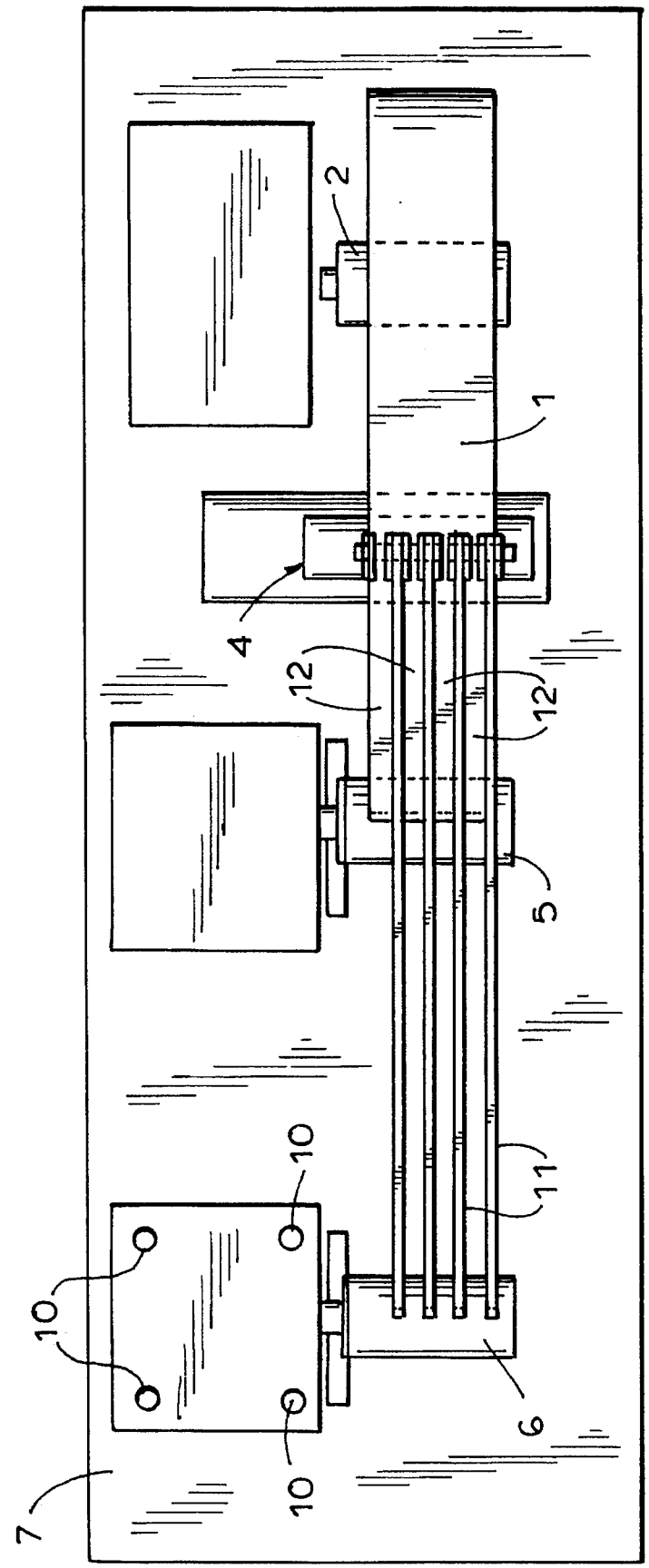

DEVICE FOR SLITTING STRIP METAL

FIELD OF THE INVENTION

The invention relates to a device for splitting a metal strip comprising a feed spool on which a coil of the metal strip is held, a circular-blade shear by means of which the metal strip pulled from the coil is split once or more, and a windup-spool apparatus for the split metal strip.

It is standard in the prior art to arrange deflecting rollers between the feed spool and the circular-blade shear and the circular-blade shear is followed by a looper with multiple deflecting rollers through which the split metal strip must pass before being guided to the windup spool. In this arrangement there are substantial differences in length of the individual substrips which probably result from the multiple deflections of the substrips about the deflecting rollers. In the prior art the circular blade shear pulls the strip and the feed spool creates a certain tension. In addition a strip press is normally provided before the windup spool.

BACKGROUND OF THE INVENTION

The prior-art devices have the disadvantage that they take up an extraordinary amount of space and in addition do not overcome the problem of the different lengths of the individual substrips.

OBJECT OF THE INVENTION

It is an object of the invention starting with the state of the art to provide a device of this type which takes up very little space and which easily controls the splitting and winding steps.

SUMMARY OF THE INVENTION

To achieve this object the invention suggests that the windup-spool apparatus has separate windup spools for the odd- and even numbered substrips adjacent one another in the splitting direction and that both windup spools are driven by motors and form the means for pulling the strip material from the coil, that the motor-driven feed spool and the circular-blade shear are driven with the same preferably constant running or peripheral speed while the windup spools are in contrast driven more rapidly, that the feed spool and the windup spools are vertically adjustable on the apparatus frame, the strip preferably running horizontally in a straight line from the feed spool to the circular-blade shear and the substrips running from the lower of the two superposed blade drums of the circular-blade shear (here the odd-numbered substrips) to the downstream windup spool at an angle (downward) from the horizontal (defined by the running strip and the nip of the circular-blade shear) and the substrips running from the upper of the two superposed blade drums of the circular-blade shear (here the even-numbered substrips) to the downstream windup spool at an angle upward from the horizontal, and in addition pneumatic or hydraulic motor-driven actuators are provided for the spools by means of which this strip-travel path is maintained generally constant.

With the device according to the invention the feed spool and the circular-blade shear run at a constant running speed. This speed can be adjusted.

Respective drive motors are provided whose speeds can be adjusted by respective controllers relative to one another. The windup spools pull the split strip with advance relative to the feed spool and the circular-blade shear from the feed spool so that during winding the tension in the substrips has a certain straightening effect so that the strip is partly straightened as it is wound up.

With the construction according to the invention not only is the space requirement reduced to a minimum, but it is possible to control the paying out and winding up of the substrips very precisely. The compact shape is in particular caused by eliminating the arrangement of loops and deflecting rollers. A strip press can also be eliminated.

Difference in lengths of the individual substrips are produced only to an insignificant extent apparently because an arrangement of multiple deflecting rollers is avoided. Apparently there is some significance to the feature of the separate winding-up of the substrips coming from the circular-blade shear.

The circular-blade shear deflects the substrips upward and downward from the cutting location from the horizontal strip surface. This cutting direction is taken into account on winding up on the windup spools and the tangent of the strip coming off the feed spool runs horizontally into the gap of the circular-blade shear and then does not exactly maintain this trajectory to the windup spools but instead the tangent of the substrips that are pushed down runs at a slight angle from the extension of the horizontal plane while the substrips that are pushed up run at a slight angle upward from this horizontal plane. The windup spools and the feed spool are adjusted transverse to the horizontal plane as the strip runs out or the substrips wind up so that regardless of how far winding has progressed the same path or winding angle is maintained.

The feed spool and the windup spools are adjusted on upright guide rods on the machine frame and for adjustment electric motors or the like can be used.

Of course the payout speed of the feed spool and the angular speed of the circular-blade shear are adjustable so that both are so set that the strip travel speed is constant. Only the windup spools are driven with a slight advance so that the strip is wound up on the windup spools under some tension. The angular speed of the windup spools is correspondingly adjustable.

A preferable feature is that the angular deviation of the substrips from the horizontal is about 1.5°.

It is further advantageous that the center spacing from the feed spool to the circular-blade shear is about 900 to 1100 mm, the center spacing from the circular-blade shear to the first windup spool is about 900 to 1100 mm, and to the second windup spool is about 2400 to 2600 mm.

BRIEF DESCRIPTION OF THE DRAWING

There is shown in:

FIG. 2 the same in top view.

SPECIFIC DESCRIPTION

Figure 1:
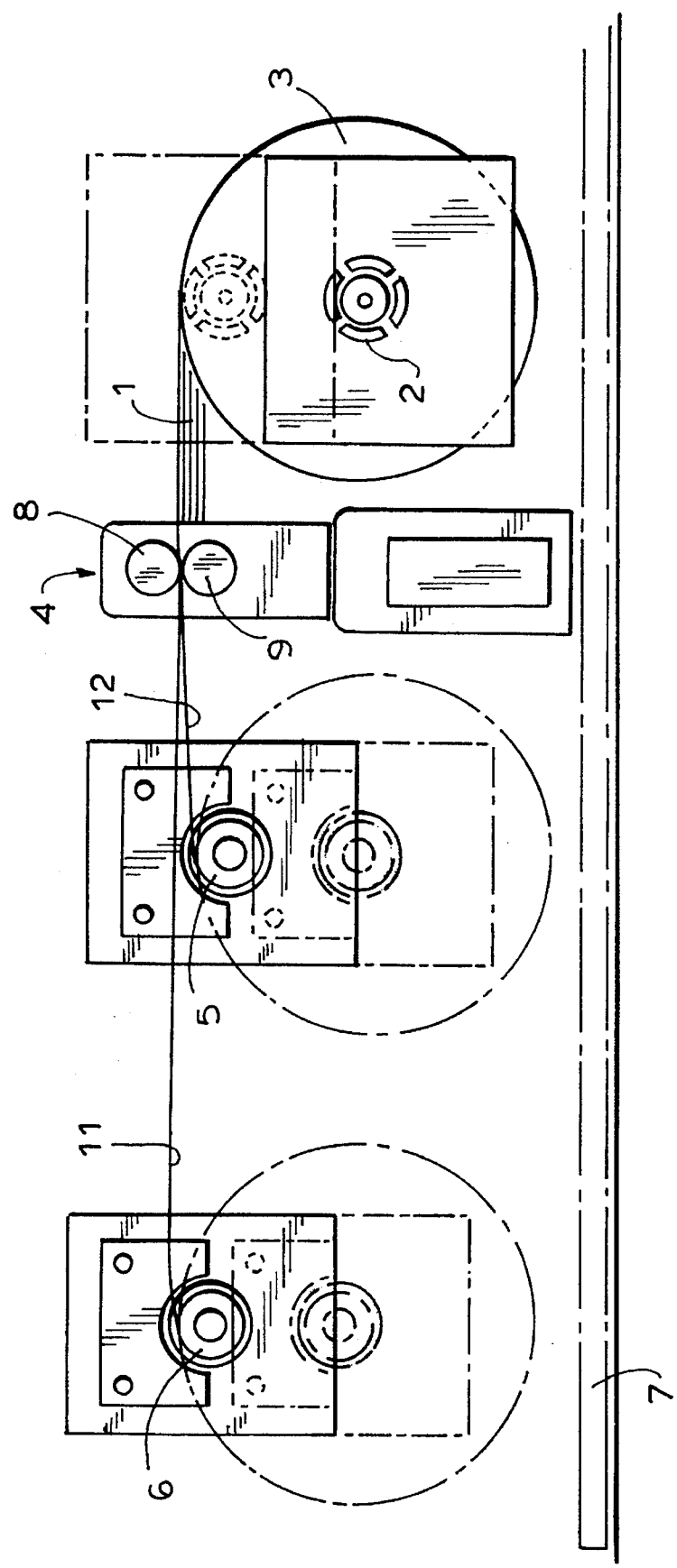
FIG. 1 a device according to the invention in side view.

The apparatus for splitting metal strip 1 comprises a feed spool 2 on which a coil 3 of the metal strip 1 is held. In addition the device comprises a circular-blade shear 4 by means of which the metal strip 1 pulled from the coil 3 is split multiply as shown in particular in FIG. 2. In the embodiment the metal strip is split into eight parts. Finally the device also comprises a windup apparatus for the split metal strips 11 and 12. The windup apparatus has windup spools 5 and 6 spaced apart in the subdivision direction for the even-number and odd-number substrips 11 and 12. Both windup spools 5 and 6 are driven by a motor and constitute pull conveyors for the strip material 1 pulled from the coil. In fact these spools 5 and 6 are run with advance so that the strip is pulled from the feed coil 2 through the circular-blade shear 4. Even the feed spool 2 and the circular-blade shear 4 are driven by motors, as a result this setup runs with a constant feed or peripheral speed. The feed spool and the windup spools 5 and 6 are mounted on the equipment frame 7 for vertical adjustment of their heights.

The strip 1 running from the feed spool 2 is guided in a straight line to the intake gap of the circular-blade shear, in particular horizontally, whereby the direction of the odd-numbered substrips 12 from the lower of the vertically oriented blade drums 8 and 9 of the circular-blade shear 4 is inclined downward at a slight angle to the horizontal (defined by the strip 1 and the intake gap of the circular-blade shear 4). The split substrips 11 (even-numbered substrips) extending from the upper of the vertically oriented blade drums 8 and 9 of the circular blade shear 4 to the windup spool 6 are inclined upward from the horizontal direction of the strip 1. In addition individual unillustrated actuators are provided for height adjustment of the spools 2, 5, and 6 by means of which the desired strip travel can be maintained somewhat constant. The travel is shown in the drawing in solid lines for the case when the coil 3 is virtually full size on the feed spool 2 and only the first turn is made about the spools 5 and 6. The dashed lines show the situation when the feed spool 2 is practically empty and the windup spools 5 and 6 are almost full.

The angular deviation of the substrips 11 and 12 from the horizontal (the path of the strip 1 between where it leaves the coil 3 and the gap of the circular-blade shear 4) is about 1.5° up or down as seen in FIG. 1. As a result of this it is possible for the entire machine to have an overall length of about 5 m. The diameter of the coil 3 can be about 660 mm. The distance from the center of the coil 2 to the circular-blade shear 4 is about 900 to 1100 mm, in this embodiment 927 mm. The distance from the center of the circular-blade shear to the first windup spool is in this embodiment 938 mm while the center-to-center spacing from the circular-blade shear 4 to the second windup spool is about 2660 mm. Guide rods which are mounted on the housing parts of the other winding device are shown schematically at 10. These guide rods ensure an exact sliding of the spools 2, 5, and 6 vertically as seen in FIG. 1. The overall length thus lies below 5 m while the overall height of the device is about 1.80 m.

I claim:

1. A method of splitting a metal strip wound up in a coil on a feed spool, the method comprising the steps of:

supporting the feed spool for rotation about a horizontal axis;

passing the strip along a generally horizontal feed plane through a rotary-blade cutter and subdividing the strip at the cutter into a plurality of even substrips and a plurality of odd substrips interleaved with the even substrips;

guiding the even substrips upward in an upper plane forming an acute angle with the feed plane from the cutter to a respective even-strip windup spool and winding the even substrips up on the even-strip windup spool;

guiding the odd substrips downward in a lower plane forming an acute angle with the feed plane from the cutter to a respective odd-strip windup spool and winding the odd substrips up on the odd-strip windup spool;

rotatably driving the cutter and the feed spool at substantially the same speed;

rotatably driving both the windup spools at a speed slightly greater than the speed of the cutter and feed spool to pull the substrips from the cutter and the strip from the feed spool; and vertically adjusting the positions of the spools to maintain the planes in substantially the same orientation relative to one another.

2. An apparatus for splitting a metal strip wound up in a coil on a feed spool, the apparatus comprising:

means for supporting the feed spool for rotation about a horizontal axis;

means including a rotary blade cutter spaced horizontally from the feed spool and having a horizontally directed nip for passing the strip along a generally horizontal feed plane through the cutter and subdividing the strip at the cutter into a plurality of even substrips and a plurality of odd substrips interleaved with the even substrips;

an even-strip windup spool spaced downstream from the cutter, the even strips being wound up thereon and the even-strip windup spool being so positioned that the even substrips pass from the cutter upward in an upper plane forming an acute angle with the feed plane to the even-strip windup spool;

an odd-strip windup spool spaced downstream from the cutter, the odd strips being wound up thereon and the odd-strip windup spool being so positioned that the odd substrips pass from the cutter downward in a lower plane forming an acute angle with the feed plane to the odd-strip windup spool;

drive means for rotatably driving the cutter and the feed spool at substantially the same speed;

drive means for rotatably driving both the windup spools at a speed slightly greater than the speed of the cutter and feed spool for pulling the substrips from the cutter and the strip from the feed spool; and means for vertically adjusting the positions of the spools to maintain the planes in substantially the same orientation relative to one another.

3. The splitting apparatus defined in claim 2 wherein the upper and lower planes extend at about 1.5° to the feed plane.

* * * * *